No. 729,634. PATENTED JUNE 2, 1903.
N. G. MOORE.
VEHICLE WHEEL.
APPLICATION FILED JAN. 8, 1903.
NO MODEL.
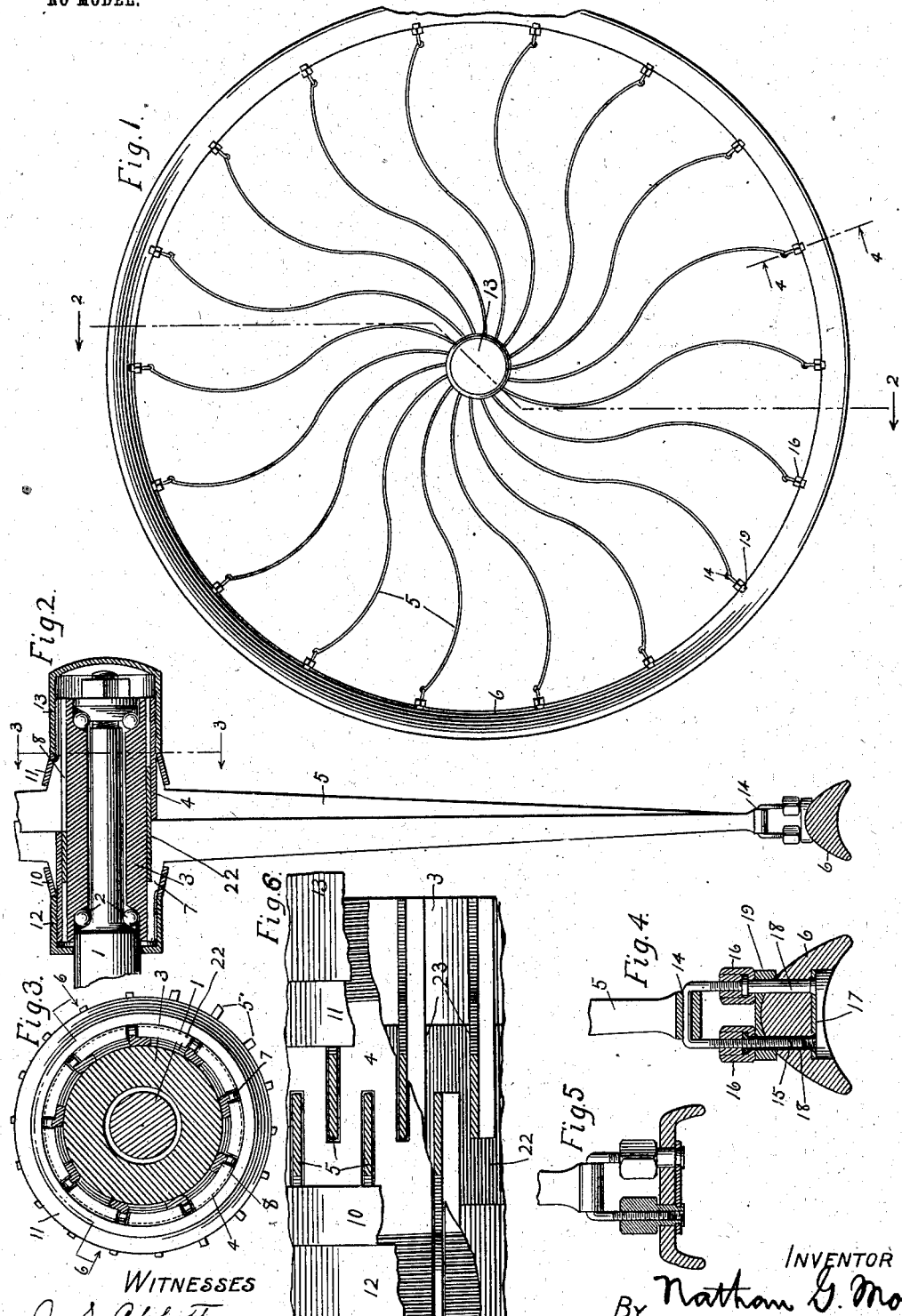
WITNESSES
J. S. Abbott
Fred' G. Fischer
INVENTOR
By Nathan G. Moore,
Burton Burton
his ATTORNEYS No. 729,634. Patented June 2, 1903.

UNITED STATES PATENT OFFICE.

NATHAN G. MOORE, OF OAKPARK, ILLINOIS.

VEHICLE-WHEEL.

SPECIFICATION forming part of Letters Patent No. 729,634, dated June 2, 1903.

Application filed January 8, 1903. Serial No. 138,240. (No model.)

*To all whom it may concern:*

Be it known that I, NATHAN G. MOORE, a citizen of the United States, residing at Oakpark, in the county of Cook and State of Illinois, have invented new and useful Improvements in Vehicle-Wheels, of which the following is a specification, reference being had to the accompanying drawings, forming a part thereof.

The purpose of this invention is to provide an improved vehicle-wheel having by virtue of its construction independently of the tire a high degree of resiliency in direction adapting it to cushion the vehicle against jar and vibration incident to travel, but having the necessary stiffness in direction to resist the end thrust of the axle or any strain tending to bow or burst the wheel.

It consists in the features of construction which are set out in the claims.

In the drawings, Figure 1 is a side elevation of a vehicle-wheel embodying my invention, partly broken away to save space. Fig. 2 is an axial section of the same. Fig. 3 is a section at the line 3 3 on Fig. 2. Fig. 4 is a detail section, on an enlarged scale, at the line 4 4 on Fig. 1. Fig. 5 is a detail section, similar to Fig. 4, showing a modified construction in which the rim is of metal. Fig. 6 is a detail partly sectional view of the hub, with portions of the several elements broken away to show interior parts, the spokes being shown in transverse section.

In the drawings I have represented a preferred form of my improved wheel; but the detail structure may be considerably modified without departing from the essential characteristic of the invention. I have shown it mounted on the axle 1, with ball-bearings 2, of familiar construction, not constituting part of my invention and not requiring specific explanation. The hub comprises a central portion 3, which is directly journaled on the axle, (by means of the ball-bearing devices,) and a sleeve 4, outside said central portion and spaced therefrom, as hereinafter explained, for the purpose of affording means of fastening the inner ends of the spokes to the hub. The spokes 5 5, &c., are springs made from steel plate cut tapered or forged in any desirable manner, narrowing from the hub to their connection to the rim 6 and longitudinally curved convex in one direction for half their length and convex in the opposite direction the other half, making them S-shaped or circumflex in longitudinal outline. At the inner wider end each spoke has a laterally-extended foot 7, which is folded at a right angle to form a lip 8. The sleeve 4 is slotted from the ends toward the middle, the slots from the opposite ends being preferably "staggered"—that is, the slots from one end being opposite a point between the slots from the other end—and one half the spokes are engaged with the hub by entering them in the slots which lead from one end, the other half being engaged by similarly entering them in the slot leading from the opposite end of the sleeve. Said sleeve is spaced from the central element 3 of the hub sufficiently to accommodate the lips 8 of the spokes when the latter are entered in their respective slots, as described. The foot 7 of each spoke, it will be seen, extends out in the slot in which the spoke is entered to or near the end of the hub, and these feet are encompassed at the opposite ends of the hub by the sleeve 4 and both by sleeves 11 and 10, respectively, so that as the sleeves are passed onto the respective ends of the hub they seat on the sleeve 4 and by its compression on the feet of the spokes and are adapted by reason of the somewhat conical shape of the cap and collar 12 and 13 to crowd the spokes firmly into the hub, causing the lips 8 to be seated firmly on the outer circumference of the inner element 3 of the hub. The sleeve 4 is exteriorly threaded at its outer ends before slotting it, and a collar 12 at one end and a cap 13 at the other end, or, in case of a bicycle-wheel, a corresponding collar, are interiorly threaded to be screwed onto the threaded ends of the sleeve. The spokes may be set apart approximating the end of the hub, in which case the sleeves 10 and 11 may be omitted. A very slight taper may be given to the threaded end, sufficient taper being produced by merely cutting the thread a little deeper toward the outer end, so that as the cap and collar, respectively, are screwed onto the sleeve the latter, which has been reduced to a multiplicity of fingers by means of the slots cut in to receive the spokes, may be contracted slightly and caused to grip the lips 8 of the spokes and clamp them onto the inner element 3 of the hub. This action will occur simultaneously with a corresponding action of the conical sleeves 10 and 11 or the collar and cap 12 and 13 on the outer edges of the shell 4 and of the feet 7 thereunder, so that by the time the collar and cap, by being screwed onto the sleeve 4, have forced the sleeves 10 and 11 snugly into place, encompassing the feet 7, not only are the lips of the inner ends of the feet forced onto the inner element 3 of the hub, but are also firmly clamped thereon by the slight closing up of the contraction of its split sleeve 4, and thus the spokes are united very rigidly to the hub. At the same time they are easily detached therefrom by removing the cap or collar and the conical sleeve behind it. The conical sleeve and the collar or cap at each end may be integral, if desired.

For the purpose of spacing the sleeve 4 from the central element 3 of the hub it is convenient to employ a band 22 of proper thickness around the central element at the middle portion of the length of the latter, the band being cut away, as seen at 23 23, to accommodate the feet of the spokes. This band may be brazed or otherwise secured to the elements 3 and 4.

The outer ends of the spokes are connected to the rim or felly pivotally, so that as the curvature of the spoke is increased and diminished under the stress of the load which the wheel carries the change of direction of the terminal portion with respect to a radius from the point of attachment of the spoke may be accommodated by the pivotal connection at such attachment. This connection is preferably made by finishing the spoke with an eye 14, which engages the cross-bar of a staple or stirrup whose ends 15 15 are secured to the rim. In order to afford means for adjusting the spokes to equalize their tension and centralize the hub, the ends 15 15 of the staples are threaded and their attachment to the rim is made by means of nuts or interiorly-threaded sleeves 16 16, which are swiveled in the rim, so that by rotating both nuts simultaneously the two ends of the staple engaged therewith are drawn up or outward away from the hub or let down inward toward the hub, thereby effecting the desired adjustment of the spokes which are pivoted to the cross-bars of the staples. When my invention is applied to a wheel having a wooden rim, I provide metal plates 17, let into the rim at the outer side and having tubular stems 18 18, which project through the rim. On the inner ends of these stems nuts 16 are swiveled and the threaded side bars of the staples engaged by the nuts protrude up within the hollow stems, washer-plates 19 being preferably interposed between the nuts and the under or inner side of the rim.

I claim—

1. A vehicle-wheel comprising, in combination with the hub and rim, spring-spokes oblong in cross-section, having circumflex curvature in the plane of rotation, and means for adjusting the attachment of the spokes at one end to vary the tension.

2. A vehicle-wheel comprising, in combination with the hub and rim, spring-spokes oblong in cross-section, having circumflex curvature in the plane of rotation, rigidly connected to the hub and pivotally connected to the rim, and means for adjusting them at the latter connection to vary the tension of the spokes.

3. A vehicle-wheel comprising, in combination with the hub and rim, spring-spokes oblong in cross-section with the longer dimension transverse to the plane of rotation, said spokes having at their inner ends a lip or flange turned off circumferentially with respect to the hub, the hub comprising an interior portion for bearing or mounting on the axle; a sleeve encompassing said interior portion having longitudinal slots or notches leading in from its opposite edges adapted for the entrance edgewise of the spokes, said sleeve being spaced from the central portion of the hub to accommodate the lip of the spokes for retaining them attached to the hub.

4. A vehicle-wheel comprising, in combination with the hub and rim, spring-spokes oblong in cross-section with the longer dimension transverse to the plane of rotation, the spokes having each an extension or foot projecting edgewise with respect to the spoke outward toward the end of the hub, the hub comprising a central portion and an encompassing sleeve which is slotted or notched from the ends inward to receive the spokes edgewise, the extensions or feet of the spokes being at their outer end adapted to stand within the outer circumference of the notched sleeve, and a collar on the sleeve encompassing the ends of the feet of the spokes and bearing against the outer edges of the latter to force them edgewise into the slots.

5. A vehicle-wheel, comprising, in combination with the hub and rim, spring-spokes oblong in cross-section with the longer dimension transverse to the plane of rotation, the spokes having at the inner or wider end an extension or foot projecting edgewise and a lip at the end of the foot turned off laterally with respect to the spoke, the hub comprising a central portion and a sleeve encompassing such central portion having extended in from its edges slots or notches adapted to receive the spokes edgewise, such sleeve being spaced from the central portion to accommodate the lips of the spokes between the central portion and the sleeve, the edge of the foot or extension being preferably sloped from the outer end inward, diverging from the axis; a corresponding sleeve encompassing the feet of the spokes, and a collar on the ends of the slotted or notched sleeve to force the inner sleeve inward and crowd the feet of the spokes firmly against the central element of the hub.

6. A vehicle-wheel comprising, in combination with the hub and rim, spring-spokes oblong in cross-section with the longer dimension transverse to the plane of rotation, the spokes having at their inner end lips turned off laterally therefrom, the hub comprising a central portion and an encompassing sleeve, notched or slotted inward from the ends or edges to receive the spokes edgewise, and spaced from the central portion sufficiently to admit the lips of the spokes between said central portion and the sleeve, said slotted or notched sleeve being exteriorly adapted for engagement with a collar, such collar engaged therewith outside the spokes, the engaging surfaces being slightly tapered, whereby the collar, when forced onto the sleeve, contracts it at the end to clamp the lips of the spokes onto the central element of the hub.

7. A vehicle-wheel comprising, in combination with the hub and rim and spring-spokes connecting them, the means of connection of the spokes to the rim, consisting of staples to whose cross-bars the spokes respectively are pivoted and whose side bars are threaded, and nuts swiveled to the rim adapted to engage said threaded side bars.

8. A vehicle-wheel comprising, in combination with a hub and rim, spring-spokes oblong in cross-section with the longer dimension transverse to the plane of rotation, having each a detachable connection with the rim, the hub having longitudinal slots extending in from the opposite ends and terminating between the ends, the inner ends of the spokes being entered edgewise in said slots to the ends of the slots respectively, and provided with lateral extensions constituting feet projecting outward and also lodged in the slots, and means encompassing the hub and the ends of the feet and engaged with the hub and stopping the spokes laterally against outward movement in the slots.

9. A vehicle-wheel comprising, in combination with the hub and rim, spring-spokes oblong in cross-section with the longer dimension transverse to the plane of rotation, the spokes being detachably connected to the rim and having at their hub-attached ends lips or flanges extending circumferentially with respect to the hub, the hub having slots extending in from the opposite ends respectively, and cavities leading from the slots circumferentially in one direction, the spokes being entered edgewise in the slots with their lips engaging in said circumferentially-extending spaces, and means on the hub detachably engaged therewith stopping the spokes laterally against outward movement in the slots.

10. A vehicle-wheel comprising, in combination with a hub and rim, spring-spokes oblong in cross-section with the longer dimension transverse to the plane of rotation, detachably connected with the rim at the outer end, the hub having slots extending in from its opposite ends respectively, and terminating between the ends, the spokes having at the inner end lateral extensions constituting feet projecting outward and sloping at the outer edge, said feet being lodged in the hub-slots respectively; a sleeve encompassing the feet at said sloping portions, and means detachably engaging the hub to crowd the sleeve onto said sloping portion of the foot.

In testimony whereof I have hereunto set my hand, in the presence of two witnesses, at Chicago, Illinois, this 29th day of December, 1902.

NATHAN G. MOORE.

In presence of—
 H. C. ADCOCK,
 FRED. G. FISCHER.